United States Patent
Morawski et al.

(10) Patent No.: US 7,572,062 B2
(45) Date of Patent: Aug. 11, 2009

(54) AXIAL TAPERED ROLLER BEARING

(75) Inventors: Diethmar Morawski, Hassfurt (DE); Erwin Treu, Niederwerrn (DE)

(73) Assignee: Fag Kugelfischer AG (DE)

( * ) Notice: Subject to any disclaimer, the term of this patent is extended or adjusted under 35 U.S.C. 154(b) by 751 days.

(21) Appl. No.: 11/201,259

(22) Filed: Aug. 10, 2005

(65) Prior Publication Data

US 2006/0039641 A1 Feb. 23, 2006

(30) Foreign Application Priority Data

Aug. 18, 2004 (DE) .................. 10 2004 039 845

(51) Int. Cl.
*F16C 19/30* (2006.01)

(52) U.S. Cl. ................. 384/593; 384/618; 384/622

(58) Field of Classification Search .............. 384/564, 384/593, 597, 618, 621, 622

See application file for complete search history.

(56) References Cited

U.S. PATENT DOCUMENTS

| 165,538 | A | 7/1875 | Bullock |
| 1,168,358 | A | 1/1916 | Weigel |
| 2,350,079 | A | 5/1944 | Spalding ............ 308/231 |

FOREIGN PATENT DOCUMENTS

| DE | 19 51 358 U | 4/1970 |
| DE | 40 16 492 A1 | 11/1990 |
| DE | 102 03 113 A1 | 8/2002 |
| JP | 59 0 29 816 A | 2/1984 |
| JP | 59 0 34 018 A | 2/1984 |
| JP | 59 0 34 019 A | 2/1984 |
| JP | 11-2-96 920 A | 10/1999 |
| JP | 2000-1-10-829 A | 4/2000 |
| JP | 2001-0-41-230 A | 2/2001 |
| JP | 2003-3-07-222 A | 10/2003 |

OTHER PUBLICATIONS

German Search Report 10 2004 039 845.3 Dated Jan. 12, 2005.

*Primary Examiner*—William C Joyce
(74) *Attorney, Agent, or Firm*—Ostrolenk, Faber, Gerb & Soffen, LLP

(57) ABSTRACT

A axial tapered roller bearing comprising an upper pressure disk, a lower pressure disk and tapered rollers between the pressure disks which are kept at uniform intervals from one another in the circumferential direction by a disk cage. The inner surface of the one pressure disk is a circulation path running radially obliquely outward for the tapered rollers and a circumferential outer rim which, with its annular surface facing the tapered rollers, is in radial supporting contact with the outer end faces of the tapered rollers, while the inner surface of the other pressure disk is formed as a flat mating circulation path for the tapered rollers. The annular surface of the outer rim of the one pressure disk has a concave curvature, and the outer end faces of the tapered rollers have a convex curvature and both in the vertical and in circumferential directions, a lubricating wedge with a constant geometry is formed which is suitable for hydrodynamic pressure development by a lubricant.

3 Claims, 2 Drawing Sheets

AXIAL TAPERED ROLLER BEARING

FIELD OF THE INVENTION

The invention relates to an axial tapered roller bearing and particularly to the shaping of the disks and rollers for optimized operation.

BACKGROUND OF THE INVENTION

Those skilled in the art of antifriction bearing engineering know that axial tapered roller bearings are used for rotational transmission of axial loads and to absorb radial tilting moments caused by shaft deflection. For example, they are used as pilot bearings in motor vehicle transmissions. Similar to the axial tapered roller bearing previously disclosed in JP 2000-110829, axial tapered roller bearings of this type substantially comprise an upper pressure disk and a lower pressure disk and a number of tapered rollers arranged between the pressure disks. The rollers are kept at uniform intervals from one another in the circumferential direction by a disk cage. In this case, the inner surface of the upper pressure disk is formed as a circulation path running radially obliquely outward for the tapered rollers and is provided with a circumferential outer rim which, with its annular surface facing the tapered rollers, is in radial supporting contact with the outer end faces of the tapered rollers. On the other hand, the inner surface of the lower pressure disk is formed as a flat mating circulation path for the tapered rollers and is provided exclusively to support axial load components.

Plano-convex contact geometry is standard in such an axial tapered roller bearing between the tapered roller end faces and the outer rim of the one pressure disk of the bearing. In this, the annular surface of the outer rim facing the tapered rollers is formed as a planar surface and the outer tapered roller end faces have the form of a sphere. This has proven to be the reason that under continuous load conditions, the originally convergent gap geometry between the tapered roller end faces and the outer rim is ground in the vertical direction into a constant spacing or into a constant lubrication gap height, as a result of the abrasive wear of the outer rim surface and the tapered roller end faces. However, this hampers the necessary hydrodynamic pressure development in the vertical direction which is a precondition for transmission of the force component at the outer rim of the axial tapered roller bearing, which results from the bearing loading, the height of the contact point path and from the outer rim and running track angle. Only the circumferential component of the hydrodynamically active relative speed of the tapered roller end faces makes it still possible to build a closed load bearing lubricating film in this case. However, a specific minimum rotational speed of the bearing is needed for this purpose. At the same time, the pressure or the peak pressure in the lubricating film decreases, as a result of the abrasive wear, which forms a greater ground contact surface between the tapered roller end faces and the outer rim. Furthermore, in the event of abrasive wear of the contact surface, the roughness peaks of the tapered roller end faces and outer rim surface meet each other, so that those peaks are bent over or sheared off, producing loose particles that contaminate the lubricant. The deformation energy or the energy resulting from shearing off the roughness peaks corresponds to the frictional energy which, as thermal energy, heats up at the lubricant and the entire bearing. The heat in the lubricant in turn causes lower viscosity of the lubricant, and this additionally reduces the lubricant gap height. Moreover, the chemical stability of the lubricant is impaired, subjecting the bearing to heat stress which is no longer acceptable, and its functioning is restricted. As the loading further increases, the load bearing lubricating film becomes thinner only builds up to an insufficient extent. The friction between the tapered roller end faces and the outer rim becomes higher until the frictional heat which is produced can no longer be dissipated, and the lubricating film finally breaks down. As a result, the tapered roller end faces rub in direct contact on the outer rim surface, with the consequence that the lubricant is burned and the bearing ultimately "seizes solid".

OBJECT OF THE INVENTION

Starting from these disadvantages of the prior art, the invention is therefore based on the object of providing an axial tapered roller bearing which, even under continuous load conditions, has a lubricating wedge between the annular surface of the outer rim, facing the tapered rollers, and the outer end faces of the tapered rollers, which at any time enables a closed loadbearing lubricating film to be built up, both in the vertical and the circumferential direction.

Other features and advantages of the present invention will become apparent from the following description of the invention which refers to the accompanying drawings.

DESCRIPTION OF THE INVENTION

According to the invention, an axial tapered roller bearing achieves the object in such that, as a result of the formation of the annular surface, facing the tapered rollers, of the outer rim of the one pressure disk with a concave curvature, and by the simultaneous formation of the outer end faces of the tapered rollers with a convex curvature, the tapered roller bearing has, between the outer rim and the tapered rollers, both in the vertical and in the circumferential direction, a lubricating wedge with a constant geometry which is suitable for hydrodynamic pressure development by a lubricant.

In a development of the axial tapered roller bearing of the invention, the curvature of the concave annular surface of the outer rim is preferably formed as a radius, and the curvature of the convex end faces of the tapered rollers is preferably formed as a further radius, the radius of the concave annular surface being greater than the radius of the convex end faces and having a defined relationship with the latter. This forms an advantageous contact geometry between the tapered roller end faces and the outer rim of the one pressure disk of the bearing, in which the annular surface, facing the tapered rollers, of the outer rim is constructed with the form of a relatively large toroidal segment, in which the outer tapered roller end faces, having the form of a sphere, slide relative to one another in the circumferential direction.

As a further feature of the axial tapered roller bearing of the invention, the centers of the radii on both the concave annular surface of the outer rim and of the convex end faces of the tapered rollers are arranged in such a way that the circular contact point path between the end faces of the tapered rollers and the annular surface of the outer rim is preferably at a height of about ⅓ the height of the outer rim. This has proven to be particularly advantageous in that the available rim height can thus be used ultimately as a loadbearing surface for the hydrodynamic pressure development by the lubricant, so that the power density of the axial tapered roller bearing is increased or, given the same overall height, the axial tapered roller bearing has a higher load index.

The constant geometry of the lubricating wedge between the tapered rollers and the outer rim of the axial tapered roller bearing is, finally, achieved in a further configuration of the axial tapered roller bearing constructed in accordance with the invention. In the circumferential direction, at the height of the contact point path, the radius of the end faces of the tapered rollers preferably has a ratio of $\Psi_H=(R_A-r)/R_A=0.04844\pm10\%$ to the radius of the outer rim, while, in the vertical direction, the radius of the annular surface of the outer rim is defined by a ratio of preferably $\Psi_V=(R-r)/R=0.26667\pm10\%$ to the radius of the end faces of the tapered rollers. As a result, even in the new state of the axial tapered roller bearing, a greater hydrodynamically effective contact area in the form of an ellipse is available between the annular surface of the outer rim and the end faces of the tapered rollers and is maintained permanently, while in known axial tapered roller bearings, this is only produced by running-in wear.

The axial tapered roller bearing of the invention thus has an advantage over known axial tapered roller bearings known from the prior art because it has a defined concave-convex contact geometry between the outer tapered roller end faces and the outer rim of the one pressure disk of the bearing. This produces a constant convergent lubricating wedge which, even under continuous load conditions, at all times permits a high hydrodynamic pressure development by a lubricant and therefore permits the build-up of a closed loadbearing lubricating film, both in the vertical and in the circumferential direction. As a result, the abrasive wear of the outer rim surface and of the tapered roller end faces that occurs in known axial tapered roller bearings, and the resulting disadvantageous effects are virtually prevented and, at the same time, the life time and the possible load bearing capacity of the axial tapered roller bearing are substantially increased.

BRIEF DESCRIPTION OF THE DRAWINGS

A preferred embodiment of the axial tapered roller bearing according to the invention is explained below with reference to the appended drawings, in which.

DESCRIPTION OF EMBODIMENTS OF THE INVENTION

Figure 1:
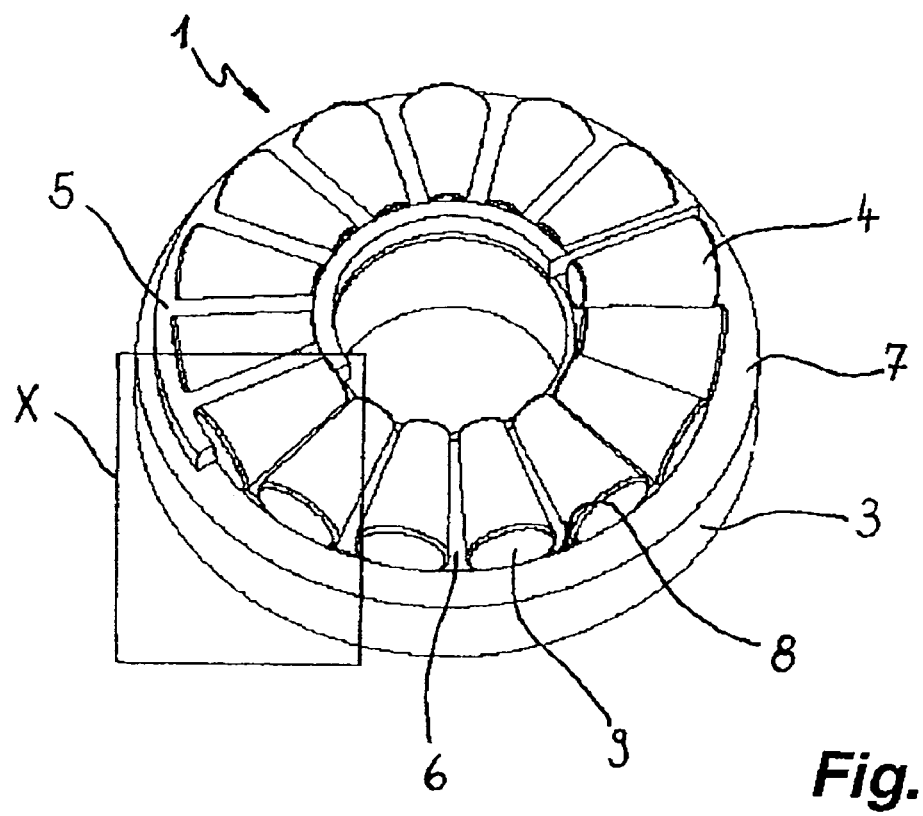
FIG. 1 shows a plan view of an axial tapered roller bearing according to the invention, in a three-dimensional illustration.
Figure 3:
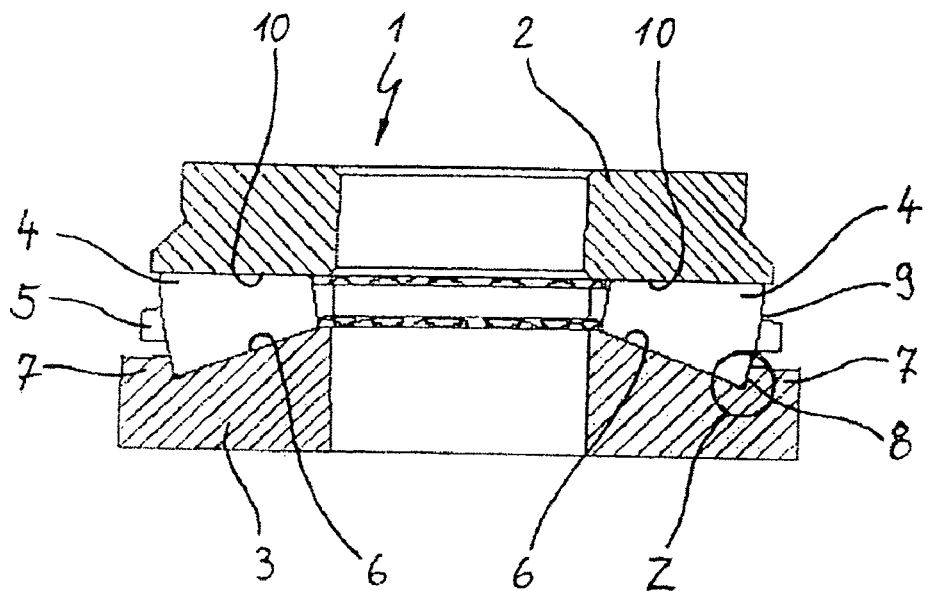
FIG. 3 shows a cross section through an axial tapered roller bearing according to the invention.

FIGS. 1 and 3 show an axial tapered bearing 1 which substantially comprises an upper pressure disk 2 and a lower pressure disk 3 and a number of tapered rollers 4 arranged between the pressure disks 2, 3. The rollers are kept at uniform intervals from one another in the circumferential direction by a disk cage 5. Furthermore, the inner surface of the lower pressure disk 3 is formed as a circulation path 6 running radially obliquely outward for the tapered rollers 4. It has a circumferential outer rim 7 which has an annular surface 8 facing the tapered rollers 4. The surface 8 is in radially supporting contact with the outer end faces 9 of the tapered rollers 4, while the inner surface of the pressure disk 2 is formed as a flat mating circulation path 10 for the tapered rollers 4.

Figure 2:
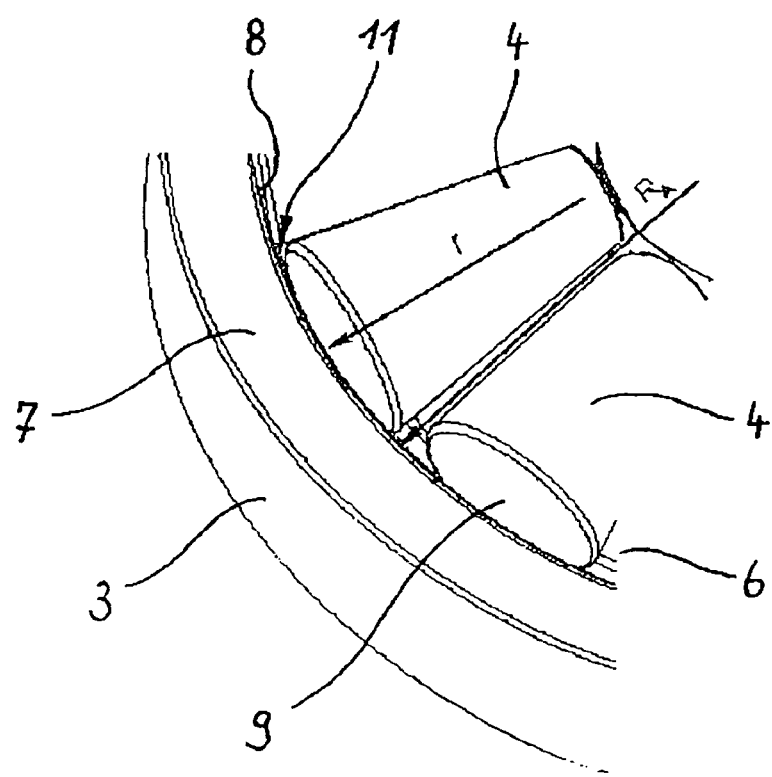
FIG. 2 shows an enlarged illustration of the detail X in FIG. 1.
Figure 4:
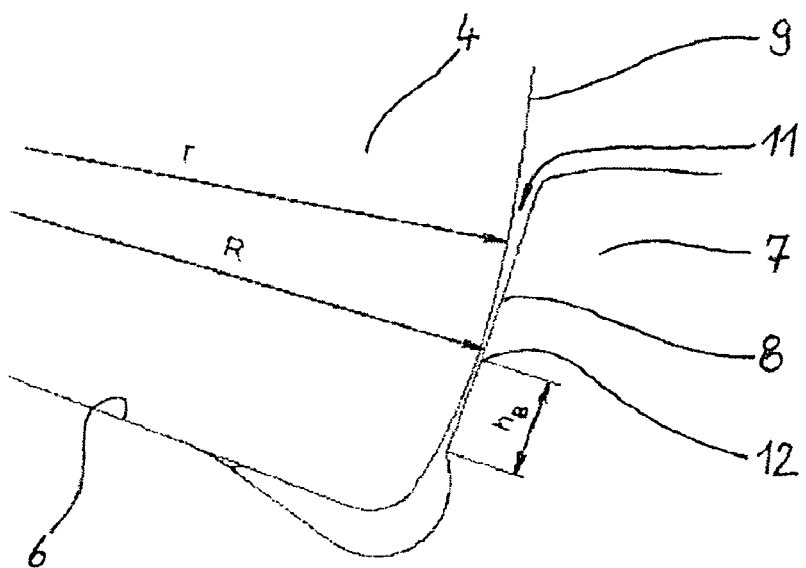
FIG. 4 shows an enlarged illustration of the detail Z in FIG. 3.

The enlarged illustrations of FIGS. 2 and 4 show that, as a result of the formation of the annular surface 8 of the outer rim 7 of the one pressure disk 3 with a concave curvature facing the tapered rollers 4, and as a result of the simultaneous formation of the outer end faces 9 of the tapered rollers 4 with a convex curvature, according to the invention, then between the tapered rollers 4 and the outer rim 7, both in the vertical and in the circumferential direction, the tapered roller bearing 1 has a lubricating wedge 11 with a constant geometry which is suitable for developing hydrodynamic pressure by a lubricant. Clearly visible in this case is the curvature of the concave annular surface 8 of the outer rim 7 having the radius R and the curvature of the convex end faces 9 of the tapered rollers 4 having the further radius r. The radius R of the concave annular surface 8 is greater than the radius r of the convex end faces 9 and has a defined relationship with said radius r.

FIG. 4 further shows that the centers of the radii R and r of the concave annular surface 8 of the outer rim 7 and of the convex end faces 9 of the tapered rollers 4 are arranged such that the circular contact point path 12 between the end faces 9 of the tapered rollers 4 and the annular surface 8 of the outer rim 7 are preferably located at a height hB of about ⅓ of the height of the outer rim 7.

Merely by way of indication, it finally emerges from FIGS. 2 and 4 that the constant geometry of the lubricating wedge 11 between the tapered rollers 4 and the outer rim 7 of the axial tapered roller bearing 1 is achieved in that, in the circumferential direction at the height of the contact point path 12, the radius r of the end faces 9 of the tapered rollers 4 has a ratio of $\Psi_H=(R_A-r)/R_A=0.04844\pm10\%$ to the radius $R_A$ of the outer rim 7, while, in the vertical direction, the radius R of the annular surface 8 of the outer rim 7 is defined by a ratio of $\Psi_V=(R-r)/R=0.26667\pm10\%$ to the radius r of the end faces 9 of the tapered rollers 4.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An axial tapered roller bearing, comprising:
an upper pressure disk, a lower pressure disk and a plurality of tapered rollers arranged between the pressure disks, the rollers having peripheries contacting the pressure disks and having radially outer end faces;
a disk cage operable to hold the rollers at uniform intervals from one another in the circumferential direction;
the other of pressure disks has a first inner surface formed as a flat mating circulation path for the tapered rollers;
the one of the pressure disks has a first inner surface formed as a circulation path running radially obliquely outward for the tapered rollers and has a circumferential outer rim with an annular surface facing the tapered rollers, and shaped and sized to be in radial supporting contact with the outer end faces of the tapered rollers;
the annular surface of the outer rim of the other pressure disk facing the tapered rollers has a concave curvature and the outer end faces of the tapered rollers have a convex curvature which is operable to cause the tapered roller bearing between the tapered rollers and the outer rim, both in the vertical and in the circumferential direction, to have a lubricating wedge with a constant geometry which is suitable for hydrodynamic pressure development by a lubricant,
wherein the curvature of the concave annular surface of the outer rim is formed as a first radius and the curvature of the convex end faces of the tapered rollers is formed as a second radius, the first radius of the concave annular surface being greater than the second radius of the convex end faces with a defined relationship, wherein the centers of the first and second radii respectively of the concave annular surface of the outer rim and of the convex end faces of the tapered rollers are arranged to define a circular contact point path between the end faces of the tapered rollers and the annular surface of the outer rim, and wherein the circular contact point path has a height ($h_B$) of about ⅓ the height of the outer rim.

2. An axial tapered roller bearing, comprising:

an upper pressure disk, a lower pressure disk and a plurality of tapered rollers arranged between the pressure disks, the rollers having peripheries contacting the pressure disks and having radially outer end faces;

a disk cage operable to hold the rollers at uniform intervals from one another in the circumferential direction;

the other of pressure disks has a first inner surface formed as a flat mating circulation path for the tapered rollers;

the one of the pressure disks has a first inner surface formed as a circulation path running radially obliquely outward for the tapered rollers and has a circumferential outer rim with an annular surface facing the tapered rollers, and shaped and sized to be in radial supporting contact with the outer end faces of the tapered rollers;

the annular surface of the outer rim of the other pressure disk facing the tapered rollers has a concave curvature and the outer end faces of the tapered rollers have a convex curvature which is operable to cause the tapered roller bearing between the tapered rollers and the outer rim, both in the vertical and in the circumferential direction, to have a lubricating wedge with a constant geometry which is suitable for hydrodynamic pressure development by a lubricant, wherein the curvature of the concave annular surface of the outer rim is formed as a first radius and the curvature of the convex end faces of the tapered rollers is formed as a second radius, the first radius of the concave annular surface being greater than the second radius of the convex end faces with a defined relationship, wherein the centers of the first and second radii respectively of the concave annular surface of the outer rim and of the convex end faces of the tapered rollers are arranged to define a circular contact point path between the end faces of the tapered rollers and the annular surface of the outer rim, and wherein the constant geometry of the lubricating wedge between the tapered rollers and the outer rim of the axial tapered roller bearing in the circumferential direction at the height ($h_6$) of the contact point path is defined by a ratio of the second radius of the end faces of the tapered rollers of $\Psi_H=(R_A-r)/R_A=0.04844\pm10\%$ to the radius of the outer rim.

3. An axial tapered roller bearing, comprising:

an upper pressure disk, a lower pressure disk and a plurality of tapered rollers arranged between the pressure disks, the rollers having peripheries contacting the pressure disks and having radially outer end faces;

a disk cage operable to hold the rollers at uniform intervals from one another in the circumferential direction;

the other of pressure disks has a first inner surface formed as a flat mating circulation path for the tapered rollers;

the one of the pressure disks has a first inner surface formed as a circulation path running radially obliquely outward for the tapered rollers and has a circumferential outer rim with an annular surface facing the tapered rollers, and shaped and sized to be in radial supporting contact with the outer end faces of the tapered rollers;

the annular surface of the outer rim of the other pressure disk facing the tapered rollers has a concave curvature and the outer end faces of the tapered rollers have a convex curvature which is operable to cause the tapered roller bearing between the tapered rollers and the outer rim, both in the vertical and in the circumferential direction, to have a lubricating wedge with a constant geometry which is suitable for hydrodynamic pressure development by a lubricant, wherein the curvature of the concave annular surface of the outer rim is formed as a first radius and the curvature of the convex end faces of the tapered rollers is formed as a second radius, the first radius of the concave annular surface being greater than the second radius of the convex end faces with a defined relationship, and wherein the constant geometry of the lubricating wedge between the tapered roller and the outer rim of the axial tapered roller bearing in the vertical direction is further defined by a ratio of the second radius of the annular surface of the outer rim of $\Psi_V=(R-r)/R=0.26667\pm10\%$ to the first radius of the end faces of the tapered rollers.

* * * * *

UNITED STATES PATENT AND TRADEMARK OFFICE
CERTIFICATE OF CORRECTION

| | | |
|---|---|---|
| PATENT NO. | : 7,572,062 B2 | Page 1 of 1 |
| APPLICATION NO. | : 11/201259 | |
| DATED | : August 11, 2009 | |
| INVENTOR(S) | : Morawski et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1036 days.

Signed and Sealed this

Seventh Day of September, 2010

David J. Kappos
*Director of the United States Patent and Trademark Office*